(12) United States Patent
Lanzatella et al.

(10) Patent No.: US 7,533,133 B1
(45) Date of Patent: May 12, 2009

(54) EXTERNALLY MANAGED FILE VERSIONS

(75) Inventors: Thomas W. Lanzatella, Minneapolis, MN (US); Oleg Kiselev, Palo Alto, CA (US); Craig K. Harmer, San Francisco, CA (US); John A. Muth, Scotts Valley, CA (US)

(73) Assignee: Symantec Operating Corporation, Mountain View, CA (US)

( * ) Notice: Subject to any disclaimer, the term of this patent is extended or adjusted under 35 U.S.C. 154(b) by 742 days.

(21) Appl. No.: 10/833,869

(22) Filed: Apr. 28, 2004

(51) Int. Cl.
*G06F 12/00* (2006.01)
(52) U.S. Cl. ...................... 707/203; 707/102
(58) Field of Classification Search ............. 707/103 R, 707/102, 203, 201; 711/170
See application file for complete search history.

(56) References Cited

U.S. PATENT DOCUMENTS

| | | | | |
|---|---|---|---|---|
| 5,857,207 | A * | 1/1999 | Lo et al. | 707/203 |
| 6,081,665 | A * | 6/2000 | Nilsen et al. | 717/116 |
| 6,088,694 | A * | 7/2000 | Burns et al. | 707/8 |
| 6,681,382 | B1 * | 1/2004 | Kakumani et al. | 717/122 |
| 2003/0065901 | A1 * | 4/2003 | Krishnamurthy | 711/170 |
| 2004/0088301 | A1 * | 5/2004 | Mahalingam et al. | 707/100 |
| 2005/0050110 | A1 * | 3/2005 | Sawdon et al. | 707/201 |
| 2005/0066095 | A1 * | 3/2005 | Mullick et al. | 710/200 |
| 2005/0114607 | A1 * | 5/2005 | Cohen | 711/135 |
| 2006/0026220 | A1 * | 2/2006 | Margolus | 707/204 |
| 2006/0179261 | A1 * | 8/2006 | Rajan | 711/162 |

OTHER PUBLICATIONS

Bhattacharya et al., "Coordinating Backup/Recovery and Data Consistency Between Database and File Systems," ACM SIGMOD '2002, Jun. 4-6, 2002, (12 pages).
Rhea et al., "Pond: the OceanStore Prototype," University of California, Berkeley, Proceedings of the 2nd USENIX Conference on File and Storage Technologies (FAST'03) 2003, (14 pages).
Narang et al., "Coordinated Backup and Recovery between Database Management Systems and File Systems," IBM, Feb. 2002, (23 pages).
Mesnier, et al., "Object-Based Storage," IEEE, Aug. 2003, pp. 84-90.

* cited by examiner

*Primary Examiner*—Don Wong
*Assistant Examiner*—Angela M Lie
(74) *Attorney, Agent, or Firm*—Robert C. Kowert; Meyertons, Hood, Kivlin, Kowert & Goetzel, P.C.

(57) ABSTRACT

A method and system for externally managed file versions. In shared storage environments file versions may be managed utilizing sparse data objects in storage devices. A file version may comprise a chain of one or more sparse data objects, where each object may represent changes compared to the data in other objects of the chain. New, empty sparse data objects may be attached to existing object chains to create new file versions. When providing file version metadata, a metadata server may provide information for the entire object chain. Write permission may be granted only for the frontmost object in a chain, while all other objects in the chain may be write-protected. A storage device may expose the presence of holes in sparse data objects to help locate information in the object chain.

25 Claims, 7 Drawing Sheets

EXTERNALLY MANAGED FILE VERSIONS

BACKGROUND OF THE INVENTION

1. Field of the Invention

This invention relates to computer systems in general, and more particularly to externally managing frozen file images in shared storage environments utilizing sparse data objects.

2. Description of the Related Art

Modern storage environments may include many interconnected storage objects. The interconnection network is the physical-layer network technology that provides the infrastructure to connect the various elements of a shared storage environment. Within the shared storage environment, file system abstractions may be built on top of logical volumes that may themselves be distributed across multiple storage devices. As the number of logical volumes and file system abstractions grows, the complexity of the entire storage environment grows dramatically.

To limit bottlenecking and improve data throughput, distributed shared storage environments may separate the actual storage of data from the management of that data. Storage architectures that employ this technique may be referred to as out-of-band or asymmetric systems. A metadata server (MDS) may provide higher-level data management functions including, among others, file system mapping, data mirror synchronization, client authentication and access privileges. The data itself is generally stored on various storage devices attached to the network. Without the need to worry about providing file system abstractions, or other metadata, storage devices may focus on provide only data storage and retrieval functionality. Object-based storage devices (OBSDs) are one example of the type of storage devices that may be employed in out-of-band or asymmetric systems.

Client nodes initially contact the MDS to request access to a specific dataset. The MDS, after authenticating the client node and applying whatever access policies are in place, generally provides the requesting client node with information (metadata) about where that particular dataset is stored, and an access token to present to the actual storage device. Client nodes may then communicate directly with storage devices, presenting the access token for reading and writing of data. The access token tells the storage device what data the client node is allowed to access, and also whether that client is allowed read/write access, or merely read-only access.

This separation of data from its associated authentication and metadata management can allow the actual data traffic to be routed around the MDS, thus preventing the MDS from becoming a bottleneck and limiting data throughput. This may also allow the MDS to be optimized for metadata lookups which may involve smaller reads and writes, while allowing the storage devices to be optimized for bulk data transfer of block reads and writes.

In distributed file systems where multiple client nodes may simultaneously access the same data, files may be fixed into specific versions to ensure data integrity among client sessions. These dataset versions may be referred to as file images.

SUMMARY

In shared storage environments, frozen file images may be realized by utilizing sparse data objects on storage devices. Managing file versions externally to the storage devices themselves may result in better scalability and less platform dependency in storage device selection on the part of system administrators. In a shared storage environment, a metadata server may create and manage file versions utilizing one or more user objects stored on one or more storage devices. A file version may comprise a chain of one or more sparse data objects, where each object may represent changes with respect to the data in other objects of the chain. A data object may comprise a logical collection of data on a storage device. Data objects may be of variable size and may provide a storage abstraction that may represent application specific structures such as files, documents, database tables, images, other media, or even entire file systems. In addition, these application specific structures may be stored in a collection of data objects where each data object represents a portion of the whole.

A metadata server may maintain an association between a file version and a sparse data object chain and provide this metadata to requesting clients. New, empty sparse data objects may be attached to existing object chains to create new file versions. When providing file version metadata, a metadata server may provide metadata information for either the entire object chain, allowing client applications to access the entire file version history, or just for the front object of the object chain, allowing client applications to access only the most current file version. Write permission may be granted only for the front-most object in a chain, while all other objects in the chain may be write-protected, thereby preventing modification or corruption of prior versions of the data. A storage device may implement these data objects as sparse data objects that maintain a logical file abstraction covering the entire file size while only storing the actual data for additions or changes to previous versions. Thus, any individual data object may contain holes in its data representation. Storage devices may be configured to expose the presence of these holes. Resolution of holes in data objects may be performed by client applications themselves, or transparently by a storage device, according to different embodiments. In some embodiments, the various data objects comprising the version history may reside on different storage devices, preventing a single storage device from resolving data holes.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. The term "data object" used herein is not intended to refer to any particular type of data structure or storage system, but instead, is intended to refer to a collection of data, and may represent one or more files, documents, data structures, or in general, any aggregate or collection of data. Additionally, multiple data objects may each represent a portion of a file, and therefore a collection of data objects may represent a single file, document or other collection of data.

DETAILED DESCRIPTION OF EMBODIMENTS

Figure 1:
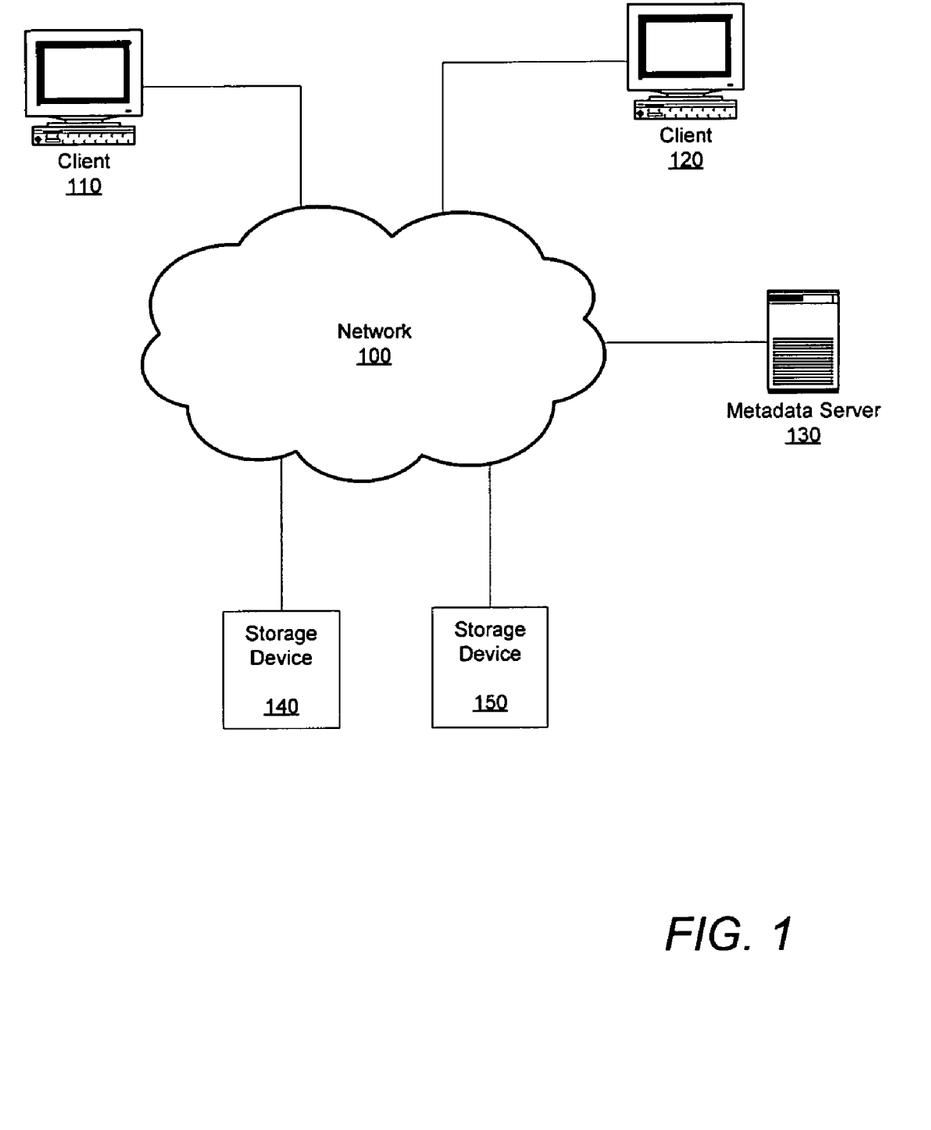
FIG. 1 illustrates, according to one embodiment, a networked system including various computer devices that may be configured to implement externally managed frozen file images.

FIG. 1 illustrates a computer network, according to certain embodiments, in which one or more devices may be configured to implement a distributed shared storage environment utilizing externally managed frozen file images. In such an embodiment, at least one computing device on Network 100 may be a client device, such as Client 110 or Client 120 with installed software that may be configured to communicate with other devices, request the creation of new file versions, frozen file images, and exchange data with storage devices. In one embodiment, at least one computing device on Network 100 may be a server device, such as Metadata Server 130 with installed software that may be configured to communicate with other devices, create new file versions, create frozen file images, maintain chains of sparse data objects, issue access tokens for data objects, provide metadata about files and file versions, and exchange data with storage devices. Metadata Server 130 may also be configured as a client device similar to Client 110 and Client 120. According to some embodiments, one or more devices may be storage devices, such as Storage Device 140 and Storage Device 150. Storage Device 140 and Storage Device 150 may be configured to provide data storage and retrieval services to other devices, such as Client 110, Client 120 and Metadata Server 130. Client devices, such as Client 110 or Client 120, may be configured to communicate with Metadata Server 130 and request the creation of a frozen file image according to one embodiment. Metadata Server 130 may in turn generate such a frozen file image.

Storage devices, such as Storage Device 140 and Storage Device 150 may provide clients with access to data objects, comprising a logical collection of data on the storage device. Data objects may be of variable size and provide a storage abstraction that may represent application specific structures such as files, documents, database tables, images, other media, or even entire file systems. In some embodiments, storage devices, such as Storage Device 140 may be configured to generate frozen file images and may provide frozen file image generation as a service to clients or metadata servers. File systems built around data objects may use multiple data objects per file image.

Metadata Server 130 may create and manage frozen file images by utilizing one or more data objects stored on one or more storage devices, such as Storage Device 140 and Storage Device 150, according to one embodiment. Metadata Server 130 may maintain metadata mappings from a logical file to the data objects that store the data for that file. In one embodiment, Metadata Server 130 may maintain metadata for multiple versions of the same file, and each version may be stored on a different data object. In other embodiments, each version of a file may be stored on multiple data objects and a metadata server may maintain a single chain comprised of all data objects for all versions of a file, where the chain of objects may itself be represented as an object. In some embodiments, Metadata Server 130 may provide an API, whereby clients may request the creation of frozen file images. Metadata Server 130 may create a frozen file image by creating a new "empty" data object that will store future additions or changes to the file while preventing additions or changes from being written to the data objects storing the earlier, now frozen, file version. In such an embodiment, a frozen file image may include more than one previous version of a file and several sparse versions may be needed to represent the current file version. In certain embodiments, Metadata Server 130 may rely upon a storage device, such as Storage Device 140 or Storage Device 150 to create a new frozen file image. In yet other embodiments, a client, such as Client 110, may directly request a storage device to create a new frozen file image.

According to some embodiments, a version of a file may comprise a chain of one or more data objects on Storage Device 140 or Storage Device 150, where each object may represent data changes or data additions compared to other objects in the chain. Metadata server 130 may maintain this association between a file image and an object chain and provide this information as metadata to requesting clients, such as Client 110 or Client 120. In some embodiments, a file image may represent multiple files or a frozen image may represent the current contents of an entire file system. The entire, current version of an image may be accessed by first reading from the most recent data object in the object chain, and then reading from earlier data objects to provide the data that is not available in the most recent object, according to some embodiments. In other embodiments, a client, such as Client 110, may first read the oldest data object, and then overwrite that data with the changes or additions read from each later data object, until a complete, current version is created.

According to one embodiment, Metadata Server 130 may generate a frozen file image by creating a new, empty data object and logically attach it to the front of the current chain of objects. When providing the metadata relating to a file image, Metadata Server 130 may provide metadata information for only the front object of the object chain when providing metadata information. For instance, in one embodiment, a storage device may be configured to resolve data holes in the object chain, thereby providing the complete current version of the data to clients. Alternatively, Metadata Server 130 may provide metadata information for all objects within the chain and their relationship to each other and how they comprise the various versions of the file, allowing clients to access not just the most current version, but the entire file history, including versions of data that have since been modified. Metadata Server 130 may only allow writing to the front-most object and write protect all other objects in the chain, thereby preventing modification or corruption of prior, frozen, versions of the file and thereby preserving the entire version history.

In certain embodiments, Metadata Server 130 may issue access tokens or capabilities granting access to a particular file version represented by a data object chain to clients such as Client 110 and Client 120. In this way, Client 110 and Client 120 may acquire read access to historical, frozen, versions of a file, and/or write access to the current version of the file, in some embodiments. When generating a frozen file image, Metadata Server 130 may, according to some embodiments, invalidate any outstanding access tokens for the object chain. In one embodiment, Metadata Server 130 may invalidate outstanding access tokens prior to generating the frozen file image, while in other embodiments, Metadata Server 130 may generate the frozen file image first, and may then invalidate any outstanding access tokens. In yet other embodiments, Metadata Server 130 may notify clients holding access tokens for an existing file version when generating a frozen file image, and may also identify the new file image, or may even provide clients with updated metadata for about the newly generated file image.

According to some embodiments, Metadata Server 130 may issue access tokens for earlier file versions stored within a data object chain allowing clients to read data from an earlier file version. In one embodiment, Metadata Server 130 may only issue access tokens allowing read-only access to earlier file versions. When reading data from an earlier version of a file, a client, such as Client 110, may be configured to recognize data holes in the one sparse data object of the earlier file version and to fill those holes by reading data from other objects of that same earlier file version. When a frozen file image is generated, any client that was writing to the older file version may need to obtain new metadata or access tokens for the new file version, according to one embodiment. In certain embodiments, clients may discover that a new file version has been created when attempting to write to the earlier version for which they still hold access tokens. In such an embodiment, a client may contact Metadata Server 130 to obtain new access tokens for the new, now current, file version.

In one embodiment, Metadata Server 130 may also create multiple new file versions, both based upon a common read-only prior version, thus branching the object chain. For example, in one embodiment, two different users, through Client 110 and Client 120, may each be creating a new version of the same base file. When creating such a branching, every logical front data object, each representing one of the new file versions, may be writable, while the common objects, representing earlier versions, may not be writable. In other embodiments, a client may request write access to an earlier, now frozen, file image and in response, Metadata Server 130 may branch the object chain by creating a new data object and attaching as a new front object of the earlier file image.

In some embodiments, a storage device, such as Storage Device 140 or Storage Device 150 may implement data objects as sparse data objects. In such an embodiment, a sparse data object may logically represent the entire size of a file or file system image, but may not have physical storage for the entire file. Such a sparse data object may only utilize physical memory as new data additions or changes are written to the logical file. A logical file abstraction may span several sparse data objects, in one embodiment. Thus, any individual data object may contain holes in its data representation. Storage Devices 140 and 150 may be configured to expose the presence of these holes when Client 110, Client 120 or Metadata Server 130 tries to read data from a sparse data object. When attempting to read a particular location within a file version, and therefore from a particular sparse data object, Client 110 may encounter a hole and may then attempt to read that location from within a different data object in the object chain based upon metadata information from Metadata Server 130. In some embodiments, Client 110 or Client 120 may have to resolve data holes in sparse data objects themselves, especially when the object chain is stored across multiple storage devices. In other embodiments, one or more storage devices may perform this type of pass-through reading transparently.

According to some embodiments, a file image may be copied, or migrated, from one storage device to another by creating a new file image on the second storage device and writing the complete file image from the first storage device to the second storage device. For example, a storage device may have multiple sparse data objects representing several versions of a file. In one embodiment, the latest version of the file may be copied to another storage device by creating a new, empty data object on the second storage device and then writing a complete file image to the new data object by reading the entire file image from across the sparse data objects on the original storage device and writing it to the second storage device. As described above, each sparse data object on the original storage device may contain holes that would then be filled by reading data from other data objects. In one embodiment, a new data object may be created on the first storage device and the complete file image may be written to that new data object and then copied over to the second storage device. In such an embodiment, since the new front data object may contain the entire file image, only that object needs to be read when copying data to a second storage device. In other embodiments, however, a complete file image may be stored in a single data object on the second storage device while the same file image may be stored across multiple data objects on the original storage device.

A client device, such as Client 110 or Client 120, may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device capable of communicating with processes or devices in a distributed shared storage environment.

Network 100, as illustrated in FIG. 1, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, Infiniband, VAX CI, or Server-Net, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments. In some embodiments, Network 100 may be the interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OBSD), or other asymmetric, out-of-band, or shared storage models.

A server device, such as Metadata Server 130, may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device capable of communicating with other processes or devices in a distributed shared storage environment. Metadata Server 130 may be configured to couple over network 100 to one or more other devices via one or more wired or wireless network interfaces.

A storage device, such as Storage Device 140 or Storage Device 150, may be any type of networkable computing device capable of communicating with and providing data storage services to other devices or processes in a distributed shared storage environment. According to various embodiments, Storage Device 140 and Storage Device 150 may be configured to implement any of numerous data storage models including but not limited to, storage-network attach, storage-network aggregation (SNA), network attached storage (NAS), storage area network (SAN), Redundant Array of Independent (or Inexpensive) Disks (RAID), or as object-based storage devices (OBSDs). In certain embodiments, Storage Device 140 may be configured to implement a combination of different data storage models. Storage Device 140 may utilize one or more of numerous types of storage media including but not limited to Hard disk storage, floppy disk storage, removable disk storage, flash memory and random access memory (RAM) are examples of storage media. The terms "storage" and "storage medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The storage medium may include other types of storage as well, or combinations thereof.

Figure 2:
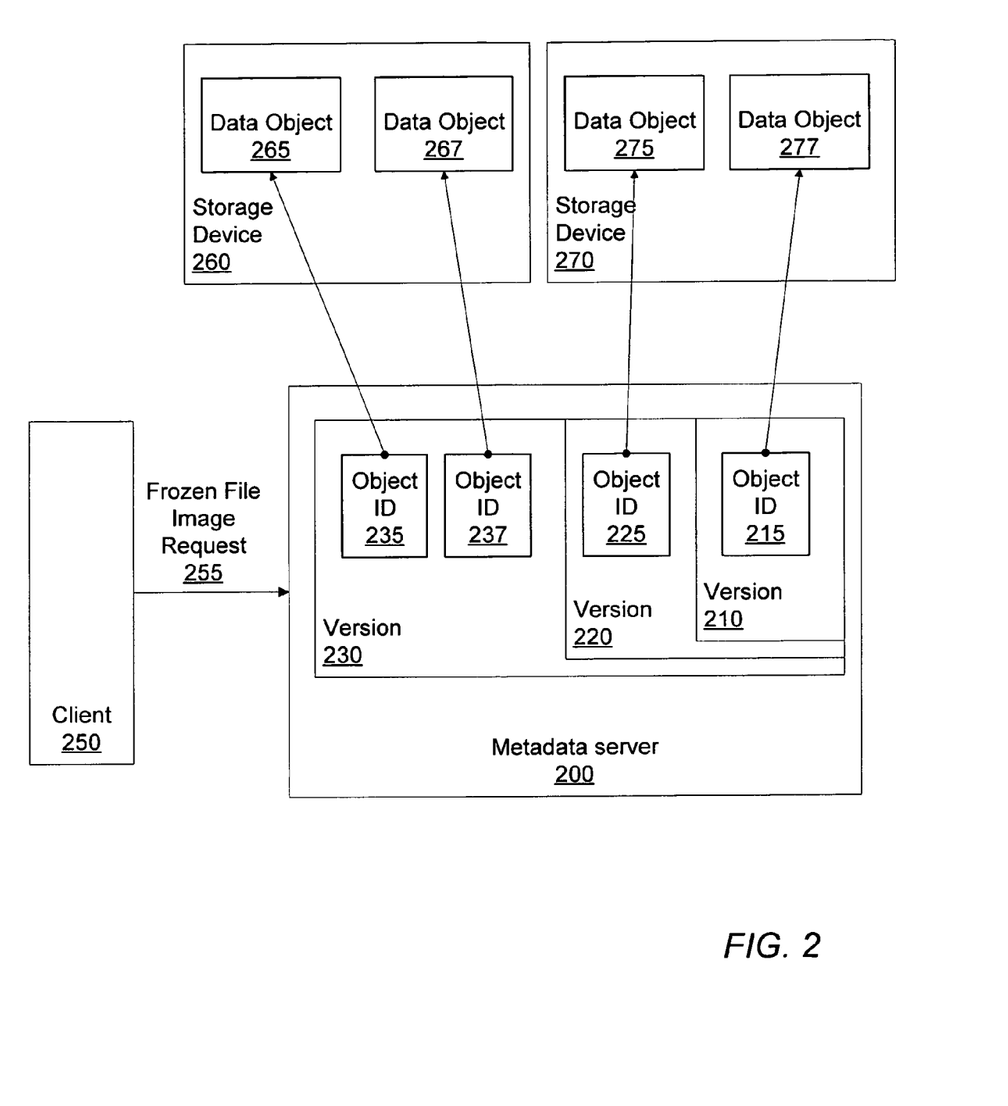
FIG. 2 illustrates, according to one embodiment, a metadata server maintaining a file version in a chain of sparse data objects.

Turning now to FIG. 2, which illustrates, according to one embodiment, the chaining of data objects to represent different versions of a file. In FIG. 2, three file versions are shown, according to one embodiment, and each file version may add one data object to the chain of data objects from the previous versions. Version 210 includes Object ID 215 that may reference Data Object 277 on Storage Device 270. Data Object 277 may store the oldest data in this embodiment. When Version 220 is created, Data Object 275 may be added logically in front of Data Object 277 to increase the data chain. Version 220 may use Object ID 225 to reference Data Object 275. For example, in one embodiment a client, such as Client 250, may request that Metadata Server 200 create Version 210. For instance, in one embodiment, Client 250 may send a message to Metadata Server 200 to request the creation of Version 210, or, in another embodiment, Client 250 may make such request through a remote procedure call. Frozen File Image Request 255 illustrates one means for requesting a frozen image of a file, according to one embodiment. In other embodiments, Client 250 may use other means to make such a request, perhaps using a simple function call, if Client 250 and Metadata Server 200 are logical parts of the same process, or perhaps through a Remote Procedure Call if they aren't.

Metadata Server 200 may then map Version 210 to Data Object 277 on Storage Device 270 through Object ID 215. Metadata Server 200 may then provide metadata information for Version 210 and an access token for Data Object 277 to Client 250. Client 250 may then write the original version of data for the file to Data Object 277 through Storage Device 270.

Later, according to one embodiment, Client 250 may request that Metadata Server 200 create a frozen image of the file. In response to Client 250's request, Metadata Server 200 may set I/O permissions of Version 210, and correspondingly Data Object 277, to read-only, thereby freezing Version 210. Additionally, Metadata Server 200 may create a new, empty, Data Object 275, also on Storage Device 270, and use Object ID 225 to link Data Object 275 with Version 220. In some embodiments, Data Object 275 may be a sparse data object storing file changes or additions that may be included in Version 220. Metadata Server 200 may set I/O permissions for Data Object 275 and Version 230 to allow reading and writing, in one embodiment.

According to one embodiment, Version 210 and Version 220 of the file may be identical, and consequently Data Object 275 may remain empty, until the first change (or addition) is written to the file. Since, in such an embodiment, Data Object 275 may be a sparse data object, and therefore may only include additions or changes, the data from Data Object 277 may be accessed when a data hole is encountered in Data Object 275. In this way, Version 220 may require the data from both Data Object 275 and Data Object 277. In another embodiment, Data Object 275 may provide a complete version of data, in which case Data Object 277 would not be used to fill in data gaps, but only to provide a previous, historical, version of the file image.

According to another embodiment, Client 250 may later request another frozen image. In response, Metadata Server 200 may create Data Object 265 on Storage Device 260 and use Object ID 235 to link Object 265 to Version 230. Hence, in one embodiment illustrated by FIG. 2, version 230 may represent the most recent version of the file. In another embodiment, more than one data object may be used to store the additions or changes between Version 220 and Version 230. For example, Object ID 237 may be used to link Data Object 267 to Version 230 in addition to Data Object 265. In such an embodiment, the data from both Data Object 265 and Data Object 267 would store the additions and changes represented by Version 230 over Version 220. Thus, in some embodiments, a single sparse data object may be used to store the differences between any two versions of a file, while in other embodiments multiple sparse data objects may be used to store data at each "link" in the version chain. FIG. 2 illustrates Data Object 265 and Data Object 267 on Storage Device 260, but in other embodiments Data Objects 265 and 267 may be stored on different storage devices. Additionally, various embodiments may store and link data object in different ways and may associate data objects and versions or images in manners different than that shown and described herein.

In one embodiment illustrated by FIG. 2, version 210 may only utilize one data object, Data Object 275 on Storage Device 270. In such an embodiment, it may take two data objects, Data Object 277 and Data Object 275, both on Storage Device 270 to represent Version 220 completely. According to one embodiment, data from Data Object 277 may have to be reconciled with additions and changes from Data Object 275. The same situation may occur with Version 230, which may require data from four data objects, Data Object 265, Data Object 267, Data Object 275, and Data Object 277, from two different storage devices, Storage Device 270 and Storage Device 260.

Other embodiments may represent versions differently or with additional information as compared to the embodiment illustrated in FIG. 2. For example, some embodiments may include more than one data object with each version, therefore requiring additional object IDs as well. According to certain embodiments, the objects of each file version may be stored on different storage devices. Hence, the chaining of data objects to create frozen file versions may not represent the literal linking of physical media within a single storage device, but may represent the logical linking of disparate data objects across distinct storage devices. Such logical linking may be maintained and stored on a metadata server, such as Metadata Server 200, according to some embodiments.

Figure 3:
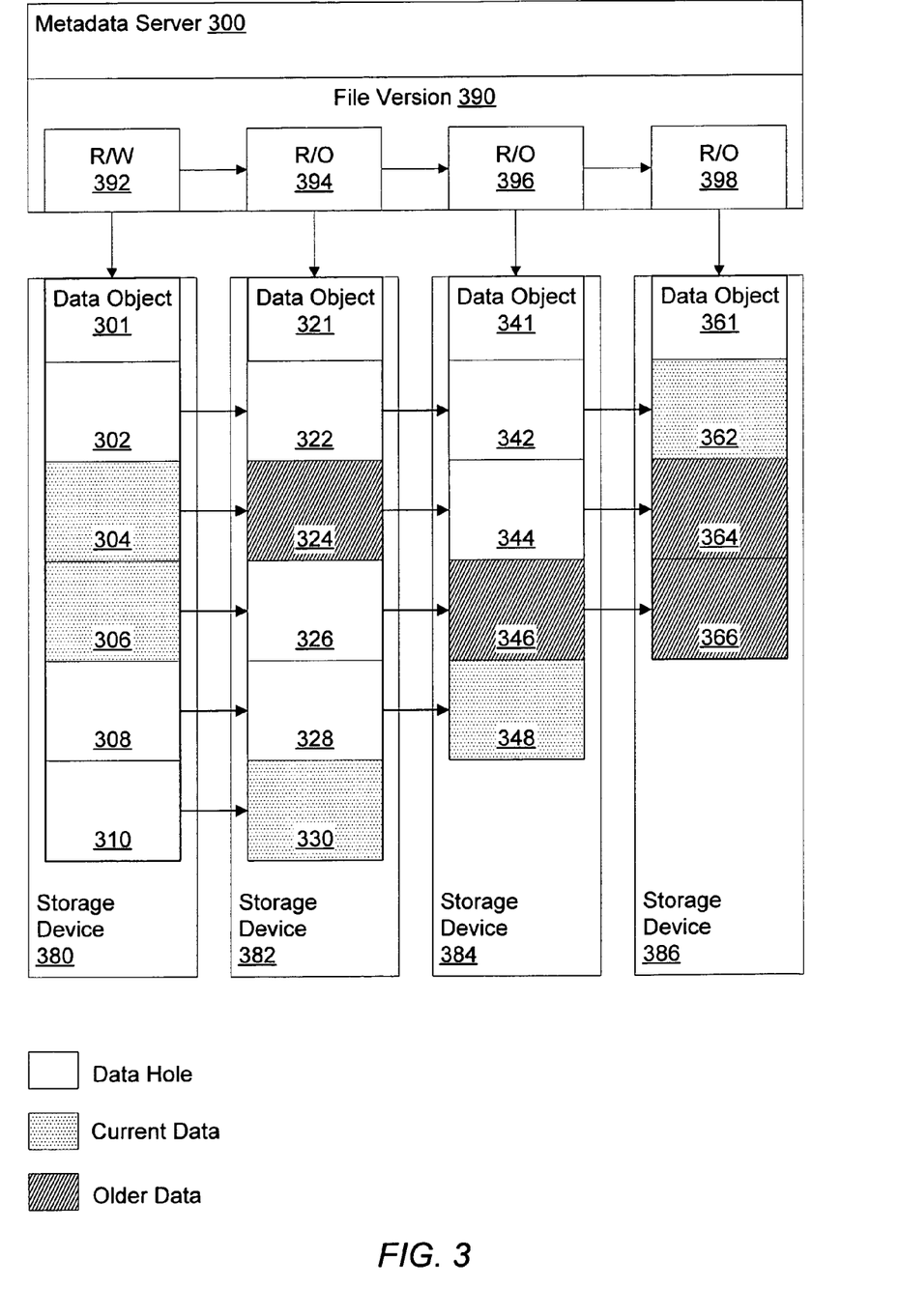
FIG. 3 is a block diagram illustrating a metadata server using I/O permissions and sparse data objects on storage devices to externally manage a file version.

FIG. 3 illustrates in more detail, the relationship between the sparse data objects representing a file version, according to one embodiment. In such an embodiment, four sparse data objects may be included in File Version 390, whose metadata is maintained by Metadata Server 300. Data from all four objects may be required to represent the entire current contents of File Version 390. In this embodiment, Data Object 301 may represent the full logical size of File Version 390, while not actually including physical data for every location within the range spanning that logical size. Data Object 301 may comprise data representing differences from the data stored in Data Object 321, which in turn may comprise data differences from Data Object 341, according to this embodiment. A similar differential relationship may exist between the data stored in Data Object 341 and Data Object 361 as well, in one embodiment. In other embodiments, more than one data object may be used to store the data differences between two sequential file versions, as described above.

For example, Data Object 341 in Storage Device 384 may contain data block 348. Data block 348 may contain the most recent data for that logical range in File Version 390, according to one embodiment. This is illustrated, by the dotted shading of block 348 in FIG. 3. According to such one embodiment, data block 328 in Data Object 321 and data block 308 in Data Object 301 may also cover that same logical range in File Version 390, but may be empty, indicating that no data more current than in data block 348 exists for that logical range. In FIG. 3, the lack of shading in a data block, such as illustrated by blocks 308 and 328, illustrates an empty data block, or a hole in a data object, such as Data Objects 301 and 321, respectively.

Similarly, data block 362 in Data Object 361 may contain the most current data for a logical range of File Version 390. As illustrated in FIG. 3, and according to one embodiment, data blocks 342, 322 and 302 in Data Objects 341, 321 and 301, respectively, may contain holes at that same logical range in File Version 390. Data blocks 304, 324, 344, and 364 may represent yet another logical range in File Version 390. In one embodiment, as illustrated in FIG. 3, data block 364 may contain the oldest data for such a logical range in File Version 390 and the Data Object 341 may contains a hole, as illustrated by empty data block 344. Data Object 321 may include changes to that logical range stored in data block 324, which were then superseded by yet more changes stored in data block 304 in Data Object 301.

For example, in one embodiment, File Version 390 may store address information for a list of people with the address information for each person stored in a different data block and the different Data Objects may be created as different versions of the address data are frozen to create different printed address books. In such an example, data block 366 may include a person's original address and data block 346 may include a newer address for that person. In this example, Data Object 321 may be created and Data Object 341 may be frozen to create a printed address book. Later changes to addresses may be stored in Data Object 321, and new addresses may be added, represented by data block 330, but since the address in data block 346 did not change data block 326 remains empty. Following this example further, after the freezing of Data Object 321 and the creation of Data Object 301, data block 306 may store the latest version of the address from data block 346.

Additional data blocks may be added to the chain and additional data is written to the file as file images, and therefore data objects, are frozen, in some embodiments. In the example described above, this may occur when a file representing an address book is expanded to include addresses for more people, according to one embodiment. In such an embodiment, as illustrated in FIG. 3, data block 348 may be added to Data Object 341 when additional data is written. Similarly, data blocks 330 and data blocks 310 may be added to Data Objects 321 and 301, respectively. It should be noted that only the front data object may be writable, as described above, and therefore data block 348 may be added to Data Object 341, prior to the creation of Data Object 321, and similarly, Data Block 330 may be added to Data Object 321 prior to the creation of Data Object 301.

According to one embodiment, Metadata Server 300 may maintain metadata information relating to File Version 390. In such an embodiment, Metadata Server 300 may keep I/O permission settings for each data object storing data for File Version 390. The data object representing the latest, or current, data of File Version 390 may be set to allow reading and writing as illustrated by I/O permission block 392. In order to prevent changes to the earlier, frozen versions, Metadata Server 300 may keep I/O permission settings that prevent writing for Data Objects 321, 341 and 361 as illustrated by I/O permission blocks 394, 396 and 398, respectively.

As in the embodiment illustrated by FIG. 3, and described above, data objects 301, 321, 341, and 361 may reside on storage devices 380, 382, 384, and 386, respectively. In one embodiment, storage devices 380, 382, 384, and 386 may represent the same physical storage device. In other embodiments, however, storage devices 380, 382, 384, and 386 may represent two or more different storage devices, possibly on different devices, such as Storage Device 140 and Storage Device 150 on Network 100. FIG. 3 also illustrates, according to one embodiment, means for setting I/O permissions for all sparse data objects in the chain to allow reading only, generating an empty sparse object on a first storage device, attaching the empty sparse object to the beginning of the chain, and setting I/O permissions for the empty sparse object to allow reading and writing. Such means for creating a new version of a file be provided by a metadata server, such as Metadata Server 300, or by a client, such as Client 110 or Client 120, illustrated in FIG. 1.

Figure 4:
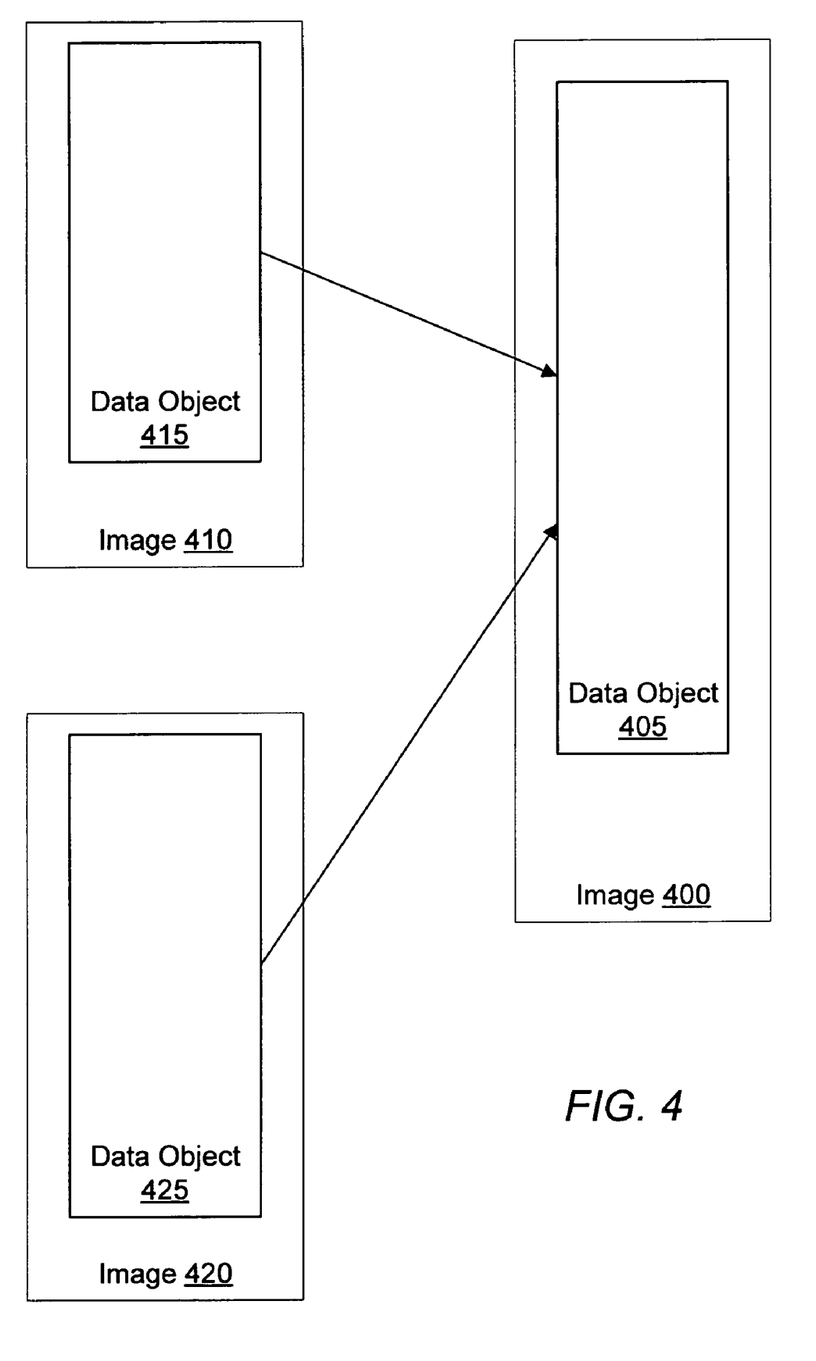
FIG. 4 is a block diagram illustrating the branching of an object chain to create two file versions based upon a common prior file version, according to one embodiment.

FIG. 4 illustrates a branched chain of three data objects that may represent three different file images, according to one embodiment. According to such an embodiment, Data Object 405 may include the data representing Image 400, the oldest file image in the chain. In one embodiment two file versions more recent than Image 400, Image 410 and Image 420, may be created. For example, perhaps two different clients wish to use the same base version for creating their own personalized images, or perhaps one client wants to create two new versions representing two different possible configurations of data.

It may not be specified, according to some embodiments, whether Image 410 or Image 420 is the most recent, just that both may be more recent than Image 400. In certain embodiments, Image 410 and Image 420 may be created at the same time. Data Object 415 relies upon data stored in Data Object 405 in order to fully represent Image 410. Similarly, in some embodiments, Data Object 425 relies upon Data Object 405 to represent the full contents of Image 420. In other words, two divergent file versions, such as Image 410 and Image 420, may both be based upon a common prior version, such as Image 400, according to one embodiment. This branching may not be limited to the end of an object chain. In other embodiments, new versions may be branched from the chain at any point in the object, and therefore version, chain. In yet other embodiments, numerous more complicated object chains and hierarchies may be developed according to the specifics of different embodiments.

As illustrated in FIG. 4, Image 400 may be a frozen file image, according to one embodiment. In such an embodiment, a metadata server, such as Metadata Server 130, Metadata Server 200, or Metadata Server 300, described above, may create frozen Image 400 by first creating a new empty data object, such as Data Object 415 or Data Object 425, to store any future additions or changes. Accordingly, such a metadata server may grant access tokens only allowing reading of Data Object 405, but may also grant access tokens allowing writing to Data Object 415 and Data Object 425, to enforce the frozen nature of Version 400.

As discussed regarding the embodiments illustrated by FIG. 3 above, Data Objects 405, 415 and 425 may be stored on the same storage device or across different storage devices, depending upon the specific nature of various implemented embodiments.

Figure 5:
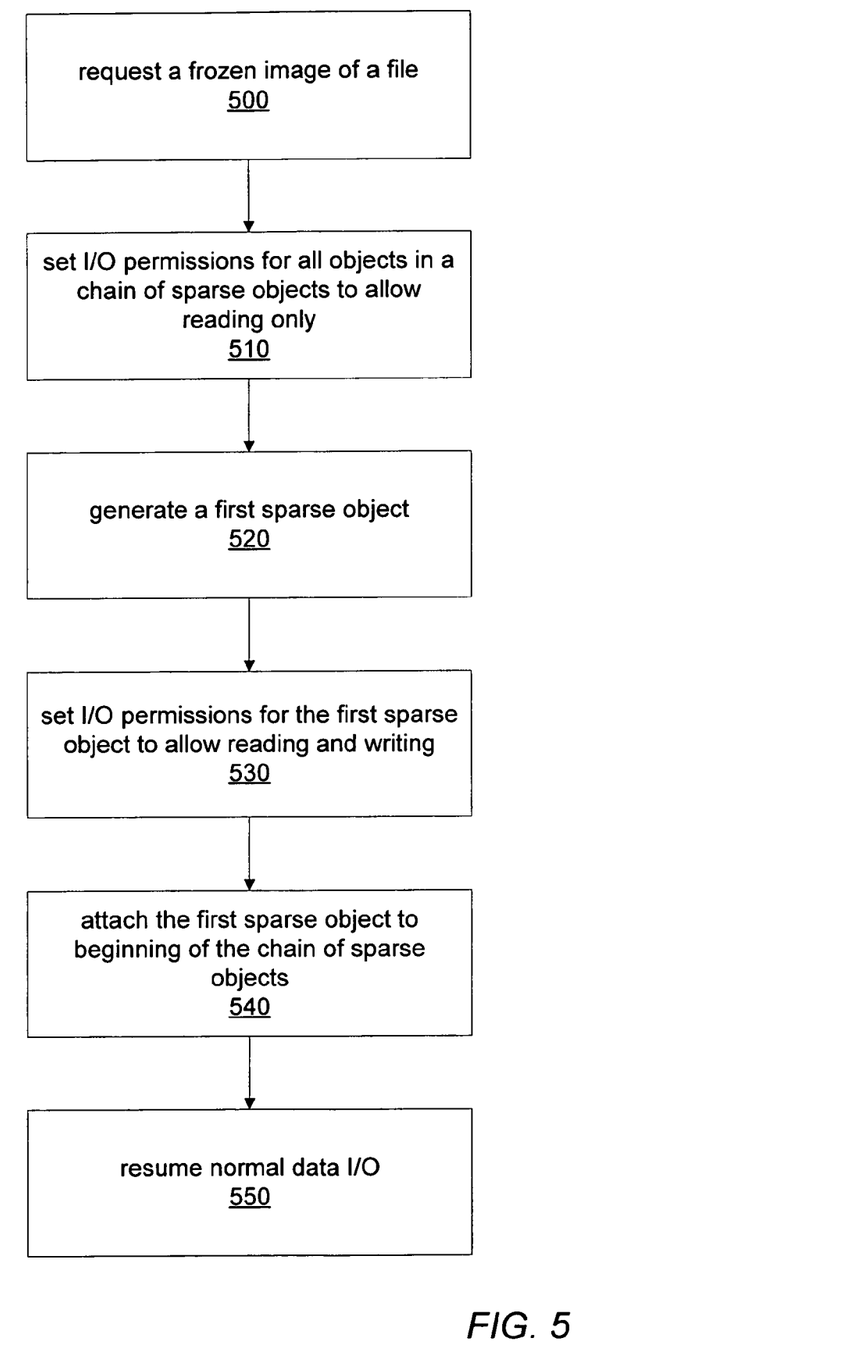
FIG. 5 is a flowchart illustrating a method for creating a new frozen file image, according to one embodiment.

FIG. 5 is a flowchart illustrating a method for generating a frozen file image, according to one embodiment. In such an embodiment, a client, such as Client 110, Client 120, or Client 250, described previously, may request the generation of a frozen file image, as illustrated by block 500. For example, a metadata server may be configured to expose a set of functions making up an API, or a message-based interface to provide file image creation services to clients. In other embodiments, a process, program or device other than a client may request such a frozen file image. In one embodiment, a metadata server, such as Metadata Server 130, 200, or 300, described previously make also make such a request either to another logical portion of the same metadata server, or from a separate metadata server. After making such a request for the generation of a frozen file image, a metadata server may set the I/O permissions of each data object in the current chain of objects to only allow reading, according to one embodiment. As described above, a metadata server may maintain metadata mappings between logical file versions, including frozen images, and the sparse data object storing the data for those versions. In some embodiments, a metadata server may create a frozen version by setting the I/O permissions for the sparse data objects storing data for the frozen version to only allow reading, as illustrated by block 510 in FIG. 5.

According to some embodiments, a metadata server, such as Metadata Server 130, may quiesce all I/O to the data objects in an object chain prior to generating a frozen file image. In such an embodiment, Metadata Server 130 may be configured to issue quiesce requests to all clients holding access tokens for the file image and in response, the clients may flush any write caches or data buffers for the file image and relinquish any access tokens for the file image.

After setting the I/O permissions of the current objects to read-only, a metadata server may generate a new empty data object as illustrated by block 520, in one embodiment. According to some embodiments, this may create a new file version by creating a new data object and attaching it to the front of the chain of objects representing the previous version of the file. For instance, a metadata server may create a new sparse data object, which may initially be empty that will store future additions and changes to the file. This may allow clients to continue to read and modify the file in a newer version, while still preserving the frozen version requested.

In one embodiment, a metadata server may set the I/O permissions of the newly created, empty data object to allow both reading and writing, as illustrated in block 530. According to some embodiments, new data written to the file may be stored in the front object and the new front object may rely upon the remainder of the objects in the chain to provide all the data for reading the new version of the file.

As illustrated in block 540 in FIG. 5, the new sparse data object may be attached to the front of the current chain of objects before normal data I/O processing is resumed, as illustrated in block 550. According to one embodiment, a single data object may store the initial contents of a file. According to such an embodiment, when a request is made to generate a frozen image of that file, a new, empty data object may be created and linked to the original object, thereby creating the object chain for that file. When additional frozen images are created for a file, additional new data objects are created and attached to the front of the chain, thereby extending the chain, and increasing the number of data objects required to represent the entire contents of the current version of the file. In certain embodiments, clients that were accessing the current, now frozen, file image may need to obtain new access tokens for the new file image. As described above, a metadata server may notify clients with outstanding access tokens and may issue new access tokens for the new file image. Alternatively, in other embodiments, clients may receive errors when attempting to write to the earlier file image and may then contact a metadata server to obtain access to the data objects of the new file image.

FIG. 5 illustrates one out of numerous possible embodiments. Other embodiments may perform the actions and functions illustrated in FIG. 5 in a different order or may omit one or more actions that are performed by the embodiment illustrated by FIG. 5. For example, one embodiment may generate the first sparse object and attached it to the start of the object chain prior to setting the I/O permissions of the objects in the object chain. In other embodiments I/O permissions may be assigned during the generation of the first sparse object and therefore may be omitted as a separate action or function.

Figure 6:
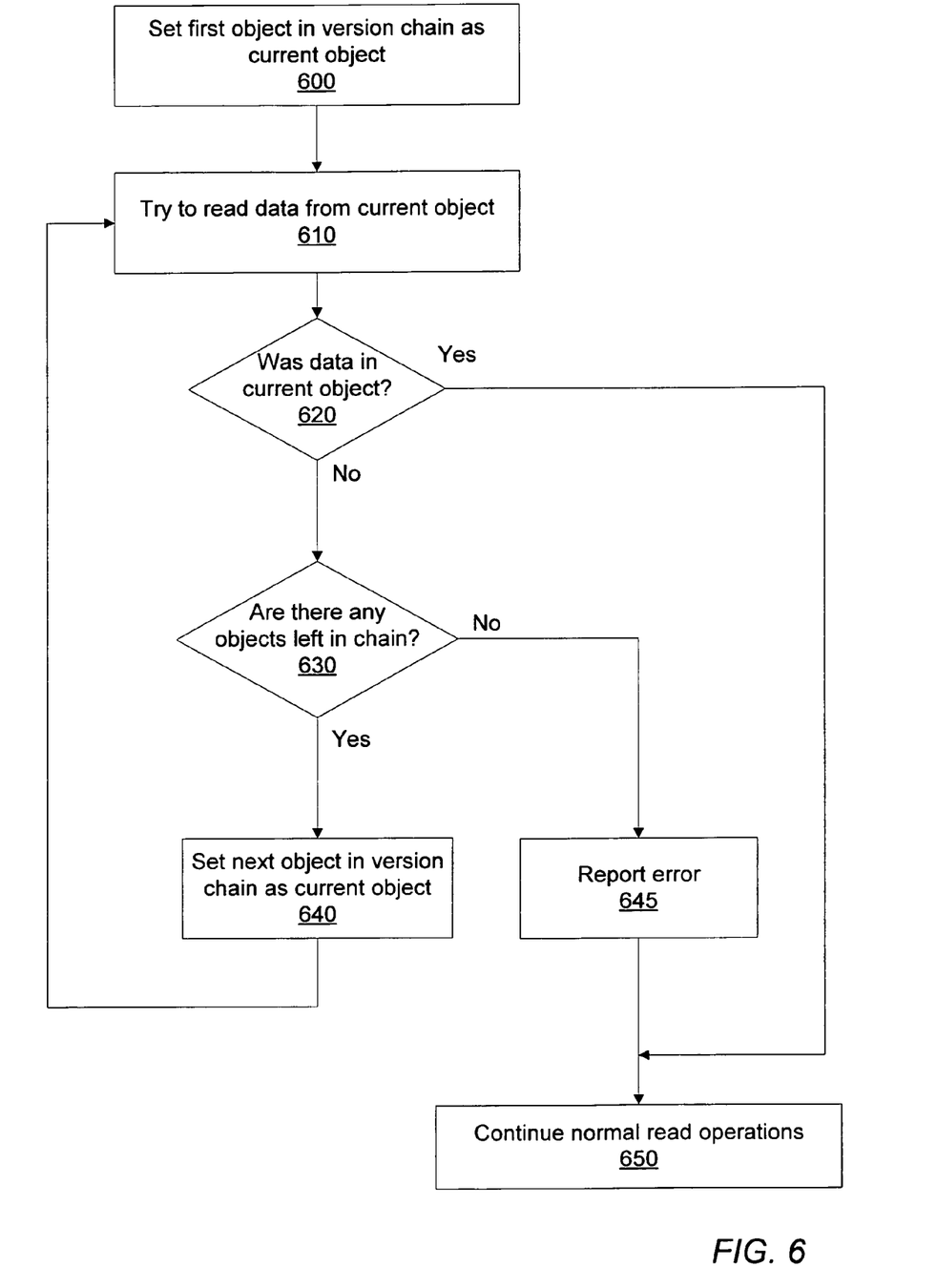
FIG. 6 is a flowchart illustrating a method for reading from a file version including sparse data objects, according to one embodiment.

FIG. 6 is a flowchart illustrating a method for reading data from a chain of sparse data objects that store data for one or more frozen file images, according to one embodiment. According to such an embodiment, a client may need to read a particular set of data from a particular location in a file. For example, perhaps a database program needs to lookup the current value for a particular data record. Alternatively, in one embodiment, a database program may need to read an earlier version of that same data record. As illustrated in FIG. 6, the client may iterate through the chain of sparse data objects, starting with the first or the data object storing the most recent changes to the data. In certain embodiments, the client may start with a data object that represents the first object of an earlier version of the data. As described above, and according to certain embodiments, that first object may only contain the required data if that data was been changed since the last frozen image was generated. If that data has not been written since the last frozen image was created, the first, or most recent, data object will have a hole at that logical data location and may report the presence of the hole to a client trying to read that logical data location, in some embodiments.

As illustrated in FIG. 6, a client may iterate through the object chain and may set the first object in the chain as the current object as shown in block 600. After attempting to read the required data from the current object, as shown in block 610, the client may then determine whether or not a hole exists in the current object at the required data's location, as shown in block 620. A storage device may be configured to respond with such a hole indication to client reads, in some embodiments. In other embodiments, the client may have to use a separate, query function to determine whether the data is present in a particular data object. If the data is present, the client may then continue normal read operations as illustrated in block 650. Alternatively, a hole may exist at that logical location in the current object, in which case the client will set the next object in the chain as the current object, as shown in block 640, after first ensuring that there are additional objects in the chain to process, as shown in block 630. If the client determines that there are additional objects in the chain to process, it may set the next object in the chain as the current object, as shown in block 640, and then loop back to trying to read the data from the current block, as shown in block 610. If the client has reached the end of the object chain without finding the data, it may continue normal read operations, as shown in block 650, perhaps reporting a data read error, as shown in block 645, according to some embodiments.

As described above, a client may not always read from the most recent object in the object chain. In some embodiments, a client may read data from an earlier version of a file and therefore may not read data from those sparse data objects representing later file versions.

FIG. 6 illustrates one out of numerous possible embodiments. Other embodiments may perform the actions and functions illustrated in FIG. 6 in a different order or may omit one or more actions that are performed by the embodiment illustrated by FIG. 6. In some embodiments the method illustrated by FIG. 6 may be performed by a client application, whereas in other embodiments a metadata server may performs such a method.

Figure 7:
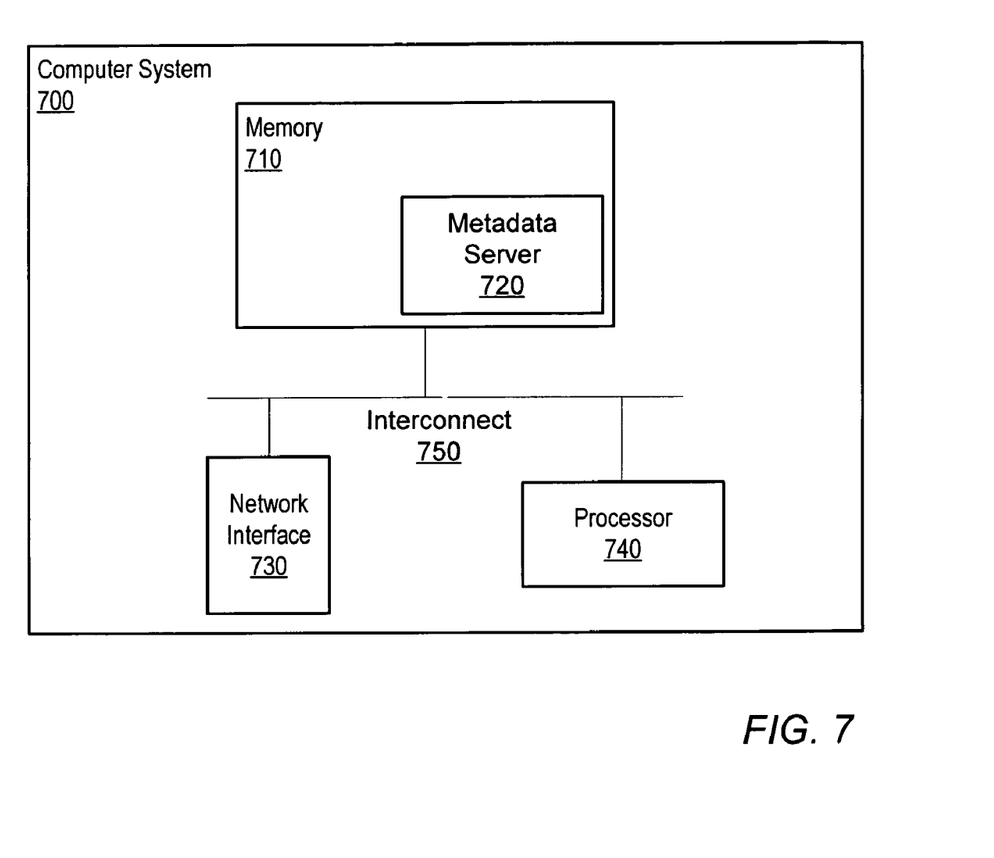
FIG. 7 is a block diagram illustrating, according to one embodiment a computer system that may be configured to implement externally managed frozen file images.

FIG. 7 illustrates a computing system capable of implementing externally managed frozen file images as described above and according to various embodiments. Computer system 700 may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device. Computer system 700 may include at least one Processor 740. Processor 740 may couple across Interconnect 750 to Memory 710 and Network Interface 730. Network Interface 730 may be any of various types of interfaces configured to couple with and communicate over Network 100 illustrated in FIG. 1 and described above.

Memory 710 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, Memory 710 may include program instructions configured to externally manage frozen file images as described above. In certain embodiments Memory 710 may include program instructions configured to implement a metadata server, such as Metadata Server 720. In one embodiment, Metadata Server 720 may include program instructions configured to externally manage frozen file images. In other embodiments, Memory 710 may include program instructions configured to implement a client such as Client 110 or Client 120 illustrated in FIG. 1 and described above. In some embodiments, such a client implemented by program instructions included in Memory 710 may perform some or all of the functions for implementing externally managed frozen file images. In certain embodiments, a metadata server, such as Metadata Server 720, may be configured to also be a client.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
   requesting a frozen image of a file, wherein the file is comprised by a first chain of one or more sparse data objects; and
   creating a new writable version of the file, said creating comprising:
   setting I/O permissions for all sparse data objects in the first chain to allow reading only;
   generating an empty sparse data object on a first storage device;
   logically attaching the empty sparse data object as an empty front data object to a beginning of the first chain; and
   setting I/O permissions for the empty front data object to allow subsequent reading and writing of the front object.

2. The method of claim 1, wherein the first chain of sparse data objects is stored on a plurality of storage devices, wherein each storage device of the plurality comprises one or more sparse data objects of the first chain.

3. The method of claim 1, further comprising:
   issuing a quiesce request to one or more accessing clients, wherein each of the one or more accessing clients holds a respective access token for the file; and
   wherein in response to the quiesce request each of the one or more accessing clients performing:
   flushing one or more data caches comprising one or more data writes for the file; and
   relinquishing the respective access token.

4. The method of claim 1, further comprising:
   reading a first datum from the file, said reading comprising:
   attempting to read the first datum from the front object;
   determining that the first datum is not in the front object; and
   in response to determining that the first datum is not in the front object, attempting to read the first datum from a second sparse data object of the first chain of sparse data objects.

5. The method of claim 4, further comprising:
   in response to determining that the first datum is not in the second sparse data object, successively attempting to read the first datum from each remaining sparse data object of the first chain of sparse data objects until determining that the first datum is in one of the sparse data objects and reading the first datum from said sparse data object.

6. The method of claim 1, wherein said creating the new version of the file is performed by a metadata server in response to a client performing said requesting the frozen image of the file.

7. The method of claim 1, further comprising:
issuing one or more commands to the storage device, wherein the one or more commands indicate that the storage device should perform said creating the new version of the file; and
wherein in response to receiving said one or more commands, the storage device performing said creating the new version of the file.

8. The method of claim 1, wherein a second chain of sparse data objects comprises one or more sparse data objects of the first chain; and the second chain comprises one or more additional sparse data objects not comprised in the first chain.

9. The method of claim 1, further comprising:
reading a datum from an earlier version of the file, said reading comprising:
attempting to read the datum from an earlier object of the first chain of sparse data objects, wherein the earlier object is one of the sparse data objects corresponding to the earlier version and was created prior to the front object;
determining that the datum is not in the earlier object; and
in response to determining that the datum is not in the earlier object, attempting to read the datum from a second sparse data object of the first chain of sparse data objects that was created prior to the earlier object.

10. A device, comprising:
a processor; and
a memory coupled to the processor, wherein the memory comprises program instructions executable by the processor to:
receive a request for a frozen image of a file, wherein the file is comprised by a first chain of one or more sparse data objects; and
create a new writable version of the file, wherein in creating the new writable version of the file, the program instructions are further configured to:
set I/O permissions for all sparse data objects in the first chain to allow reading only;
generate an empty sparse data object on a first storage device;
logically attach the empty sparse data object as an empty front object to a beginning of the first chain; and
set I/O permissions for the empty front object to allow subsequent reading and writing of the front object.

11. The device of claim 10, wherein the first chain of sparse data objects is stored on a plurality of storage devices, wherein each storage device of the plurality comprises one or more sparse data objects of the first chain.

12. The device of claim 10, wherein the program instructions are further executable by the processor to:
issue a quiesce request to one or more accessing clients, wherein each of the one or more accessing clients holds a respective access token for the file; and
wherein in response to the quiesce request each of the one or more accessing clients is configured to:
flush one or more data caches comprising one or more data writes for the file; and
relinquish the respective access token.

13. The device of claim 10, wherein the program instructions are further executable by the processor to:
read a first datum from the file, wherein in reading the first datum the program instructions are further configured to:
attempt to read the first datum from the front object;
determine that the first datum is not in the front object; and
in response to determining that the first datum is not in the front object, attempt to read the first datum from a second sparse data object of the first chain of sparse data objects.

14. The device of claim 13, wherein the program instructions are further executable by the processor to:
in response to determining that the first datum is not in the second sparse data object, successively attempt to read the first datum from each remaining object of the first chain of sparse data objects until determining that the first datum is in one of the sparse data objects.

15. The device of claim 10, wherein said creating the new version of the file is performed by a metadata server in response to a client performing said requesting the frozen image of the file.

16. The device of claim 10, wherein the program instructions are further executable by the processor to:
issue one or more commands to the storage device, wherein the one or more commands indicate that the storage device should perform said creating the new version of the file; and
wherein in response to receiving said one or more commands, the storage device performs said creating the new version of the file.

17. The device of claim 10, wherein the metadata server resides on the first storage device and wherein one or more of the objects of the first chain is stored on a different storage device.

18. A computer accessible storage medium, comprising program instructions computer-executable to implement:
receiving a request for a frozen image of a file, wherein the file is comprised by a first chain of one or more sparse data objects; and
creating a new writable version of the file, said creating comprising:
setting I/O permissions for all sparse data objects in the first chain to allow reading only;
generating an empty sparse data object on a first storage device;
logically attaching the empty sparse data object as an empty front object to a beginning of the first chain; and
setting I/O permissions for the empty front object to allow subsequent reading and writing of the front object.

19. The computer accessible storage medium of claim 18, wherein the first chain of sparse data objects is stored on a plurality of storage devices, wherein each storage device of the plurality comprises one or more sparse data objects of the first chain.

20. The computer accessible storage medium of claim 18, wherein the program instructions are further computer-executable to implement:
issuing a quiesce request to one or more accessing clients, wherein each of the one or more accessing clients holds a respective access token for the file; and
wherein in response to the quiesce request each of the one or more accessing clients performing:

flushing one or more data caches comprising one or more data writes for the file; and relinquishing the respective access token.

21. The computer accessible storage medium of claim 18, wherein the program instructions are further computer-executable to implement:

reading a first datum from the file, wherein said reading comprises:

attempting to read the first datum from the front object;

determining that the first datum is not in the front object; and in response to determining that the first datum is not in the front object, attempting to read the first datum from a second sparse data object of the first chain of sparse data objects.

22. The computer accessible storage medium of claim 21, wherein the program instructions are further computer-executable to implement:

in response to determining that the first datum is not in the second sparse data object, successively attempting to read the first datum from each remaining object of the first chain of sparse data objects until determining that the first datum is in one of the sparse data objects.

23. The computer accessible storage medium of claim 18, wherein said creating the new version of the file is performed by a metadata server in response to a client performing said requesting the frozen image of the file.

24. The computer accessible storage medium of claim 18, wherein the program instructions are further computer-executable to implement:

issuing one or more commands to the storage device, wherein the one or more commands indicate that the storage device should perform said creating the new version of the file; and wherein in response to receiving said one or more commands, the storage device performing said creating the new version of the file.

25. A system, comprising:

means for requesting a frozen image of a file, wherein the file is comprised by a first chain of one or more sparse data objects; and means for creating a new writable version of the file, said means for creating comprising:

means for setting I/O permissions for all sparse data objects in the first chain to allow reading only, generating an empty sparse data object on a first storage device, logically attaching the empty sparse data object as an empty front object to a beginning of the first chain, and setting I/O permissions for the empty front object to allow subsequent reading and writing of the front object.

* * * * *